United States Patent
Ono et al.

(10) Patent No.: US 9,216,641 B2
(45) Date of Patent: Dec. 22, 2015

(54) DRIVING DEVICE FOR HYBRID VEHICLE

(75) Inventors: Tomohito Ono, Gotenba (JP); Yuji Iwase, Mishima (JP); Makoto Funahashi, Gotenba (JP); Atsushi Tabata, Okazaki (JP); Tooru Matsubara, Toyota (JP); Tatsuya Imamura, Okazaki (JP); Koichi Okuda, Toyota (JP); Hideaki Komada, Gotenba (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/375,659

(22) PCT Filed: Feb. 1, 2012

(86) PCT No.: PCT/JP2012/052299
§ 371 (c)(1),
(2), (4) Date: Oct. 3, 2014

(87) PCT Pub. No.: WO2013/114594
PCT Pub. Date: Aug. 8, 2013

(65) Prior Publication Data
US 2015/0021110 A1    Jan. 22, 2015

(51) Int. Cl.
*B60K 6/445* (2007.10)
*B60K 6/547* (2007.10)
*B60K 6/365* (2007.10)
(Continued)

(52) U.S. Cl.
CPC ............. *B60K 6/547* (2013.01); *B60K 6/365* (2013.01); *B60K 6/387* (2013.01); *B60K 6/445* (2013.01); *B60W 10/111* (2013.01); *B60W 20/20* (2013.01); *F16H 3/728* (2013.01); *B60K 2006/381* (2013.01); *F16H 2037/0873* (2013.01); *F16H 2200/201* (2013.01);
(Continued)

(58) Field of Classification Search
CPC ...................................................... B60K 6/445
USPC .............................................. 180/65.1–65.29
See application file for complete search history.

(56) References Cited

U.S. PATENT DOCUMENTS 8,480,522 B2 *   7/2013   Akutsu et al. ............... 475/5
2008/0195286 A1   8/2008   Tabata et al.
(Continued)

FOREIGN PATENT DOCUMENTS

EP   2616712        7/2013
JP   2008-195303 A  8/2008
(Continued)

Primary Examiner — John Walters
Assistant Examiner — James Triggs
(74) Attorney, Agent, or Firm — Sughrue Mion, PLLC

(57) ABSTRACT

A driving device for a hybrid vehicle including a power transmission mechanism (10) that is connected to an engine (1) and transmits a rotation of the engine; a differential mechanism (20) that connects the power transmission mechanism to driving wheels (32); and a switching device (CL1, BK1) that performs speed change of the power transmission mechanism, wherein the differential mechanism includes a first rotary element (24) that is connected to an output element (13) of the power transmission mechanism, a second rotary element (21) that is connected to a first rotating electrical machine (MG1) and a third rotary element (23) that is connected to the second rotating electrical machine (MG2) and the driving wheels, and wherein the rotation of the output element of the power transmission mechanism is limited by the switching device.

7 Claims, 11 Drawing Sheets

(51) Int. Cl.
*F16H 3/72* (2006.01)
*B60W 20/00* (2006.01)
*B60K 6/387* (2007.10)
*B60W 10/111* (2012.01)
*F16H 37/08* (2006.01)
*B60K 6/38* (2007.10)

(52) U.S. Cl.
CPC .................. *F16H 2200/2007* (2013.01); *F16H 2200/2097* (2013.01); *Y02T 10/6239* (2013.01); *Y10S 903/919* (2013.01)

(56) References Cited

U.S. PATENT DOCUMENTS

| | | |
|---|---|---|
| 2010/0029429 A1 | 2/2010 | Ota |
| 2011/0034282 A1 | 2/2011 | Akutsu et al. |
| 2012/0065015 A1 | 3/2012 | Tamai et al. |

FOREIGN PATENT DOCUMENTS

| | | |
|---|---|---|
| JP | 2008-265600 A | 11/2008 |
| JP | 2009-190694 A | 8/2009 |
| WO | 2013/114595 A1 | 8/2013 |

\* cited by examiner

FIG.3

| | DRIVING CONDITION | | | CL1 | BK1 | MG1 | MG2 |
|---|---|---|---|---|---|---|---|
| EV | FORWARD | SINGLE MOTOR | | △ | △ | G | M |
| | | BOTH MOTORS | | ○ | ○ | M | M |
| | BACKWARD | SINGLE MOTOR | | | | | M |
| | | BOTH MOTORS | | ○ | ○ | M | M |
| HV | FORWARD | DIFFERENTIAL | LOW | ○ | | G | M |
| | | | HIGH | | ○ | G | M |
| | BACKWARD | | LOW | ○ | | G | M |

○: ENGAGEMENT
△: ANY ONE IS ENGAGED WHEN ENGINE BRAKE IS USED
G: MAINLY GENERATOR UPON DRIVING
M: MAINLY MOTOR UPON DRIVING

F I G . 12
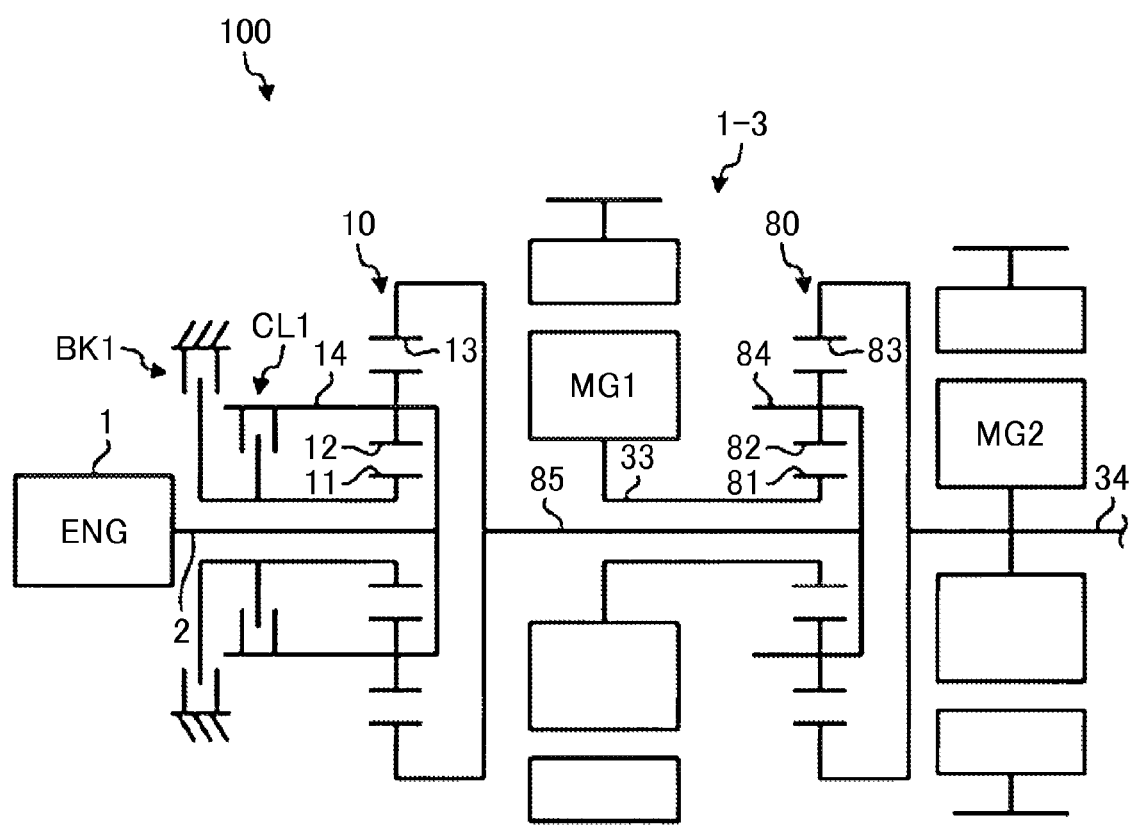

DRIVING DEVICE FOR HYBRID VEHICLE

CROSS REFERENCE TO RELATED APPLICATIONS

This application is a National Stage of International Application No. PCT/JP2012/052299 filed Feb. 1, 2012, the contents of all of which are incorporated herein by reference in their entirety.

TECHNICAL FIELD

The present invention relates to a driving device for a hybrid vehicle.

BACKGROUND ART

Conventionally, there has been known a hybrid vehicle which includes a gear transmission mechanism. For example, Patent document 1 has disclosed a technology about a driving device for a hybrid vehicle which includes a gear transmission mechanism configured to transmit a rotation of an internal combustion engine to a power split mechanism through speed change, a first transmission shaft configured to transmit a power from the internal combustion engine to the gear transmission mechanism and a second transmission shaft configured to transmit a power output from the gear transmission mechanism to the power split mechanism. The gear transmission mechanism mentioned in the patent document 1 includes a differential mechanism in which two planetary gear mechanisms are combined, a first brake capable of stopping a rotation of a ring gear R1 of the differential mechanism, a second brake capable of stopping a rotation of a ring gear R2 and a clutch configured to interrupt transmission of power from the first transmission shaft to the ring gear R1.

PRIOR ART DOCUMENT

Patent Document

PATENT DOCUMENT 1: Japanese Patent Application Publication No. 2009-190694 (JP 2009-190694 A)

SUMMARY OF THE INVENTION

Problem to be Solved by the Invention

In the hybrid vehicle including a mechanism capable of transmitting a rotation of an engine through speed change, preferably, the driving device can be simplified. For example, it is preferable that the configuration of the driving device is simple and traveling with two rotating electrical machines used as power sources can be achieved.

An object of the present invention is to provide a driving device for the hybrid vehicle capable of performing speed change for the rotation of an engine and traveling with two rotating electrical machines used as power sources with a simple structure.

Means for Solving the Problem

A driving device for a hybrid vehicle of the present invention includes: a power transmission mechanism that is connected to an engine and transmits a rotation of the engine; a differential mechanism that connects the power transmission mechanism to driving wheels; and a switching device that performs speed change of the power transmission mechanism, wherein the differential mechanism includes a first rotary element that is connected to an output element of the power transmission mechanism, a second rotary element that is connected to a first rotating electrical machine and a third rotary element that is connected to a second rotating electrical machine and the driving wheels, and wherein the rotation of the output element of the power transmission mechanism is limited by the switching device.

In the above-mentioned driving device for the hybrid vehicle, preferably, the power transmission mechanism can accelerate and output a rotation of the engine.

In the above-mentioned driving device for the hybrid vehicle, preferably, the power transmission mechanism can decelerate and output a rotation of the engine.

Preferably, the above-mentioned driving device for the hybrid vehicle has a mode of limiting the rotation of an output element of the power transmission mechanism by means of the switching device and traveling with the first rotating electrical machine and the second rotating electrical machine used as power sources.

In the above-mentioned driving device for the hybrid vehicle, preferably, the power transmission mechanism is a differential mechanism and the switching device performs speed change of the power transmission mechanism by switching between a state of limiting a differential motion of the power transmission mechanism and a state of permitting a differential motion of the power transmission mechanism.

In the above-mentioned driving device for the hybrid vehicle, preferably, the speed changes in the power transmission mechanism and the differential mechanism are performed at the same time.

In the above-mentioned driving device for the hybrid vehicle, preferably, when the speed changes in the power transmission mechanism and the differential mechanism are performed at the same time, a transmission gear ratio of one of the power transmission mechanism and the differential mechanism is increased while he transmission gear ratio of the other one is decreased.

In the above-mentioned driving device for the hybrid vehicle, preferably, the power transmission mechanism is a differential mechanism and the switching device includes a clutch capable of connecting rotary elements of the power transmission mechanism and a brake that limits the rotation of the rotary elements of the power transmission mechanism.

Effect of the Invention

The driving device for the hybrid vehicle according to the present invention includes: a power transmission mechanism that is connected to an engine and transmits a rotation of the engine; a differential mechanism that connects the power transmission mechanism to driving wheels; and a switching device that performs speed change of the power transmission mechanism. The differential mechanism includes a first rotary element that is connected to an output element of the power transmission mechanism, a second rotary element that is connected to a first rotating electrical machine and a third rotary element that is connected to a second rotating electrical machine and the driving wheels. The driving device for the hybrid vehicle limits the rotation of the output element of the power transmission mechanism by the switching device. With a simple structure, the driving device for the hybrid vehicle according to the present invention exerts an effect that the speed change can be performed during driving of the engine and that the vehicle can travel with two rotating electrical devices used as power sources.

BRIEF DESCRIPTION OF THE DRAWINGS

FIG. 3 is a diagram showing an operating engagement table of the driving device for a hybrid vehicle according to the embodiment.

FIG. 12 is a skeleton diagram of a vehicle according to a second modification of the embodiment.

MODES FOR CARRYING OUT THE INVENTION

Hereinafter, a driving device of a hybrid vehicle according to an embodiment of the present invention will be described with reference to the drawings. In the meantime, the present invention is not restricted by the embodiment. Further, components of the embodiment described below include the components which those skilled in the art can imagine easily or substantially equivalent ones thereto.

[Embodiment]

Figure 1:
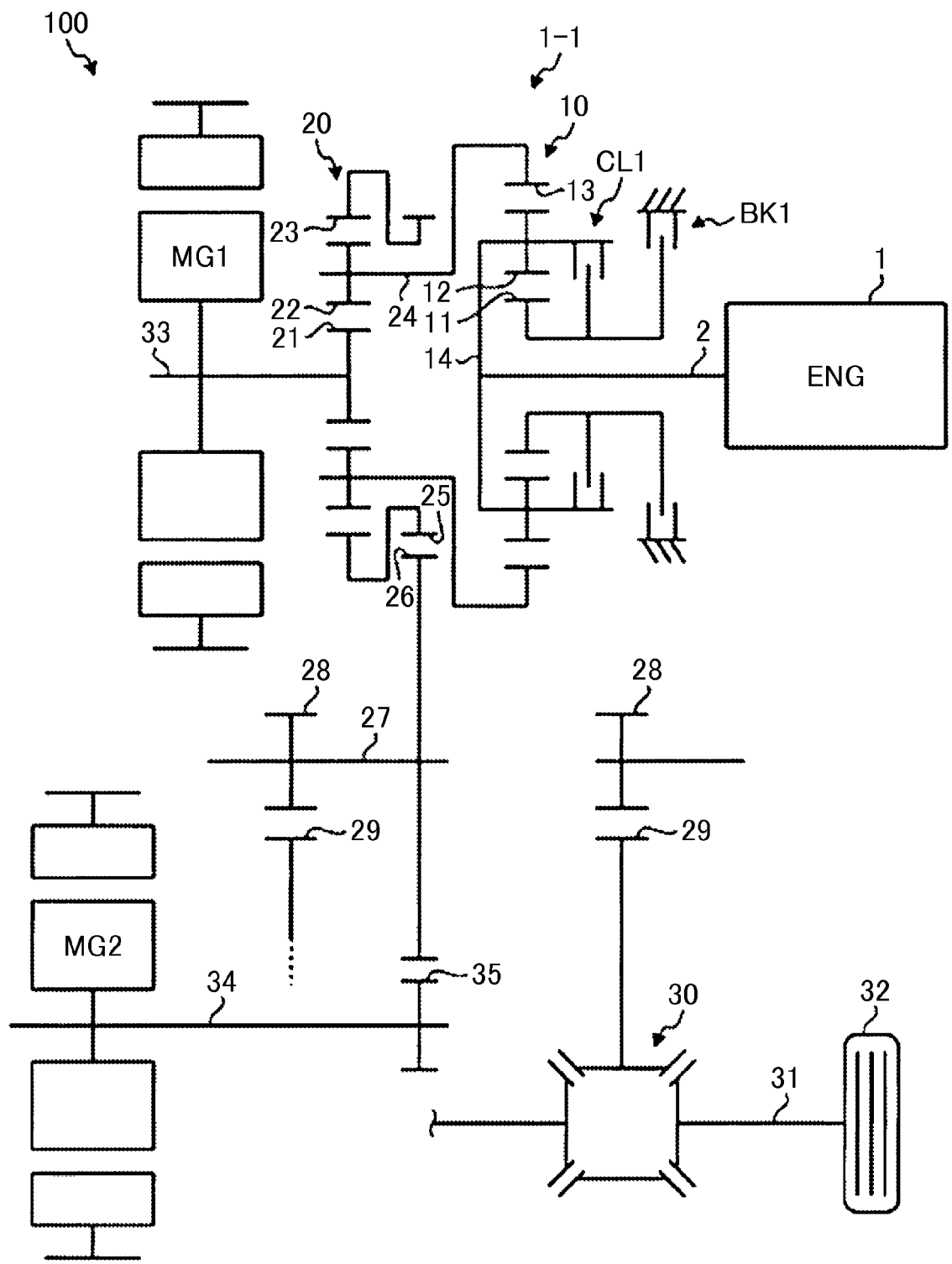
FIG. 1 is a skeleton diagram of a vehicle according to an embodiment.
Figure 2:
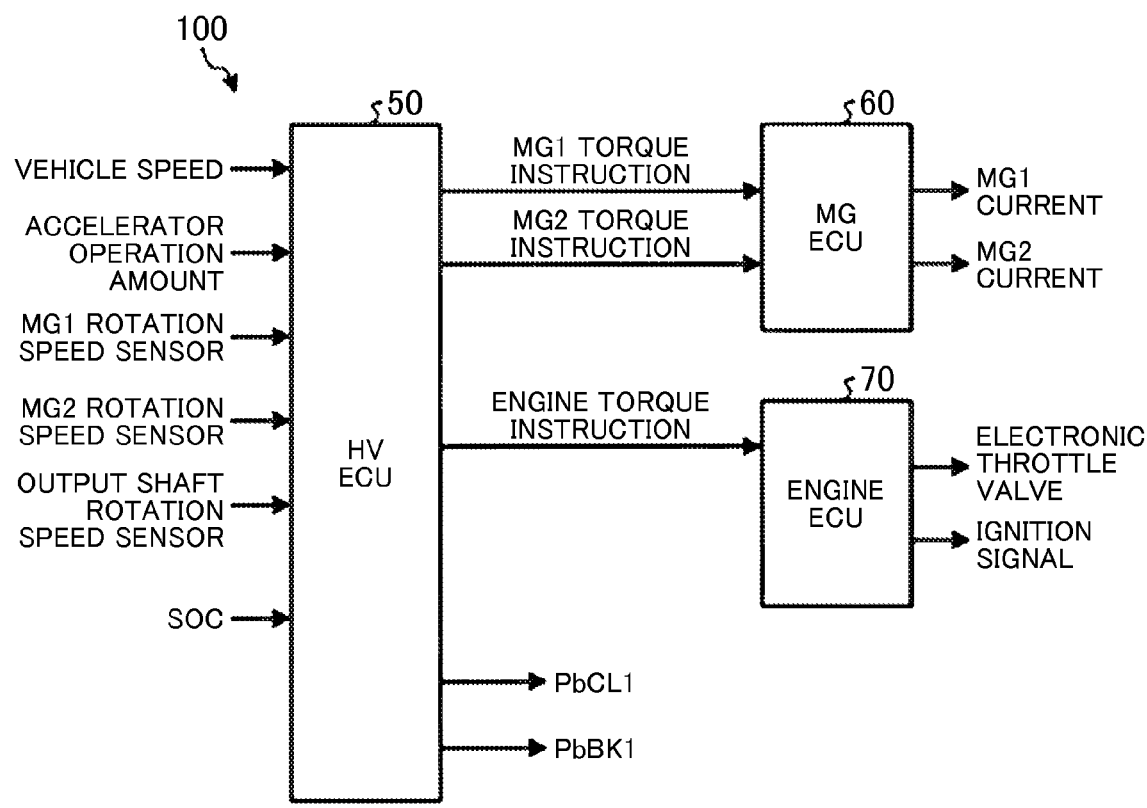
FIG. 2 is an input/output relation diagram of the vehicle according to the embodiment.

The embodiment will be described with reference to FIG. 1 to FIG. 10. The present embodiment relates to a driving device for a hybrid vehicle. FIG. 1 is a skeleton diagram of a vehicle according to the embodiment of the present invention and FIG. 2 is an input/output relation diagram of the vehicle according to the embodiment.

A vehicle 100 of the present embodiment is a hybrid vehicle which includes an engine 1, a first rotating electrical machine MG1 and a second rotating electrical machine MG2 as power sources. The vehicle 100 may be a plug-in hybrid vehicle capable of being chargeable from an external electric power supply. As shown in FIGS. 1 and 2, the vehicle 100 includes the engine 1, a first planetary gear mechanism 10, a second planetary gear mechanism 20, the first rotating electrical machine MG1, the second rotating electrical machine MG2, a clutch CL1, a brake BK1, a HV ECU 50, a MG ECU 60 and an engine ECU 70.

Further, the driving device for the hybrid vehicle 1-1 according to the present embodiment includes the first planetary gear mechanism 10, the second planetary gear mechanism 20, the clutch CL1, and the brake BK1. The driving device for the hybrid vehicle 1-1 may further include respective control devices such as ECU 50, 60, 70. The driving device for the hybrid vehicle 1-1 may be applied to a FF (front engine, front wheel drive) vehicle or a RR (rear engine, rear wheel drive) vehicle or the like. The driving device for the hybrid vehicle 1-1 is mounted on the vehicle 100 with an axial direction thereof aligned with a vehicle width direction, for example.

In the driving device for the hybrid vehicle 1-1 of the present embodiment, a transmission gear unit is constituted of the first planetary gear mechanism 10, the clutch CL1 and the brake BK1. Further, the differential unit is constituted of the second planetary gear mechanism 20. Further, a switching device that performs speed change of the first planetary gear mechanism 10 is constituted of the clutch CL1 and the brake BK1.

The engine 1 which is a combustion engine converts fuel combustion energy into rotary motion of an output shaft for output. The output shaft of the engine 1 is connected to an input shaft 2. The input shaft 2 is an input shaft for a power transmission device. The power transmission device includes the first rotating electrical machine MG1, the second rotating electrical machine MG2, the clutch CL1, the brake BK1 and a differential device 30. The input shaft 2 is arranged coaxially with the output shaft of the engine 1 and on an extension line of the output shaft. The input shaft 2 is connected to a first carrier 14 of the first planetary gear mechanism 10.

The first planetary gear mechanism 10 of the present embodiment is connected to the engine 1 and corresponds to the power transmission mechanism which transmits a rotation of the engine 1. As an example of the power transmission mechanism, the first planetary gear mechanism 10 which serves as a differential mechanism is shown here. The first planetary gear mechanism 10 is mounted on the vehicle 100 as a first differential mechanism. The first planetary gear mechanism 10 is an input side differential mechanism which is arranged on the engine 1 side relative to the second planetary gear mechanism 20. The first planetary gear mechanism 10 can output a rotation of the engine 1 through speed change. The first planetary gear mechanism 10 is of single pinion type, including a first sun gear 11, a first pinion gear 12, a first ring gear 13 and a first carrier 14.

The first ring gear 13 is coaxial with the first sun gear 11 and arranged outside in the radial direction of the first sun gear 11. The first pinion gear 12 is arranged between the first sun gear 11 and the first ring gear 13 and meshes with the first sun gear 11 and the first ring gear 13. The first pinion gear 12 is supported rotatably by the first carrier 14. The first carrier 14 is connected to the input shaft 2 and rotates integrally with the input shaft 2. The first pinion gear 12 can rotate around the center axis of the input shaft 2 together with the input shaft 2 (rotate around an axis other than its own) and can rotate around the center axis of the first pinion gear 12 supported by the first carrier 14 (rotate around its own axis).

The clutch CL1 is a clutch device which can connect the first sun gear 11 with the first carrier 14. Although the clutch CL1 may be for example, friction engagement type clutch, it is not limited to this type but a known clutch device such as a claw type clutch may be used as the clutch CL1. The clutch CL1 is controlled by hydraulic pressure, for example, so that it is engaged or released. The clutch CL1 in complete engagement condition can connect the first sun gear 11 with the first carrier 14 and rotate the first sun gear 11 and the first carrier 14 integrally. The clutch CL1 in a complete engagement condition limits the differential motion of the first planetary gear mechanism 10. On the other hand, the clutch CL1 in a release condition separates the first sun gear 11 from the first carrier 14 to allow the first sun gear 11 and the first carrier 14 to rotate relative to each other. That is, the clutch CL1 in release condition allows the differential motion of the first planetary gear mechanism 10. In the meantime, the clutch CL1 can be controlled into a semi-engagement condition.

The brake BK1 is a brake device capable of limiting the rotation of the first sun gear 11. The brake BK1 includes an engaging element which is connected to the first sun gear 11 and an engaging element which is connected to a vehicle body side, for example, a casing of the power transmission device. Although the brake BK1 may be a friction engagement type clutch device similar to the clutch CL1, it is not limited to this type but any known clutch device such as the claw clutch may be used as the brake BK1. The brake BK1 is controlled by hydraulic pressure, for example, so that it is engaged or released. The brake BK1 in a complete engagement condition can connect the first sun gear 11 to the vehicle body side to limit the rotation of the first sun gear 11. On the other hand, the brake BK1 in a release condition separates the first sun gear 11 from the vehicle body side to allow the rotation of the first sun gear 11. In the meantime, the brake BK1 can be controlled into a semi-engagement condition.

The second planetary gear mechanism 20 of the present embodiment corresponds to a differential mechanism configured to connect the first planetary gear mechanism 10 to driving wheels 32. The second planetary gear mechanism 20 is mounted on the vehicle 100 as a second differential mechanism. The second planetary gear mechanism 20 is an output side differential mechanism which is arranged on the driving wheel 32 side relative to the first planetary gear mechanism 10. The second planetary gear mechanism 20 is of single pinion type, including a second sun gear 21, a second pinion gear 22, a second ring gear 23 and a second carrier 24. The second planetary gear mechanism 20 is arranged coaxially with the first planetary gear mechanism 10 and opposed to the engine 1 across the first planetary gear mechanism 10.

The second ring gear 23 is coaxial with the second sun gear 21 and arranged outside in the radial direction of the second sun gear 21. The second pinion gear 22 is arranged between the second sun gear 21 and the second ring gear 23 and meshes with the second sun gear 21 and the second ring gear 23. The second pinion gear 22 is supported rotatably by the second carrier 24. The second carrier 24 is connected to the first ring gear 13 and rotates integrally with the first ring gear 13. The second pinion gear 22 can rotate around the center axis of the input shaft 2 together with the second carrier 24 (rotate around an axis other than its own) and can rotate around the center axis of the second pinion gear 22 supported by the second carrier 24 (rotate around its own axis). The first ring gear 13 is an output element of the first planetary gear mechanism 10 and can output a rotation input to the first planetary gear mechanism 10 from the engine 1 to the second carrier 24. The second carrier 24 corresponds to a first rotary element which is connected to the output element of the first planetary gear mechanism 10.

A rotary shaft 33 of the first rotating electrical machine MG1 is connected to the second sun gear 21. The rotary shaft 33 of the first rotating electrical machine MG1 is arranged coaxially with the input shaft 2 and rotates integrally with the second sun gear 21. The second sun gear 21 corresponds to a second rotary element connected to the first rotating electrical machine MG1. A counter drive gear 25 is connected to the second ring gear 23. The counter drive gear 25 is an output gear which rotates integrally with the second ring gear 23. The second ring gear 23 corresponds to a third rotary element which is connected to the second rotating electrical machine MG2 and the driving wheels 32. The second ring gear 23 is an output element capable of outputting a rotation input from the first rotating electrical machine MG1 or the first planetary gear mechanism 10 to the driving wheels 32.

The counter drive gear 25 meshes with a counter driven gear 26. The counter driven gear 26 is connected to a drive pinion gear 28 via a counter shaft 27. The counter driven gear 26 rotates integrally with the drive pinion gear 28. A reduction gear 35 meshes with the counter driven gear 26. The reduction gear 35 is connected to a rotary shaft 34 of the second rotating electrical machine MG2. That is, a rotation of the second rotating electrical machine MG2 is transmitted to the counter driven gear 26 via the reduction gear 35. The reduction gear 35 has a smaller diameter than the counter driven gear 26 and reduces a rotation speed of the second rotating electrical machine MG2 and transmits to the counter driven gear 26.

The drive pinion gear 28 meshes with a differential ring gear 29 of the differential device 30. The differential device 30 is connected to the driving wheels 32 via right/left drive shafts 31. The second ring gear 23 is connected to the driving wheels 32 via the counter drive gear 25, the counter driven gear 26, the drive pinion gear 28, the differential device 30 and the drive shaft 31. The second rotating electrical machine MG2 is connected to a power transmission path between the second ring gear 23 and the driving wheels 32, and capable of transmitting power to each of the second ring gear 23 and the driving wheels 32.

The first rotating electrical machine MG1 and the second rotating electrical machine MG2 have a function as the motor (motor) and a function as a generator. The first rotating electrical machine MG1 and the second rotating electrical machine MG2 are connected to a battery via an inverter. The first rotating electrical machine MG1 and the second rotating electrical machine MG2 can convert electric power supplied from the battery to mechanical power and output, and can be driven by an input power to convert mechanical power to electric power. Electric power generated by the rotating electrical machines MG1, MG2 can be stored in the battery. As the first rotating electrical machine MG1 and the second rotating electrical machine MG2, for example, the AC synchronous motor generator can be used.

In the vehicle 100 of the present embodiment, coaxially with the engine 1, the brake BK1, the clutch CL1, the first planetary gear mechanism 10, the counter drive gear 25, the second planetary gear mechanism 20 and the first rotating electrical machine MG1 are arranged in order from the engine 1 side. The driving device for the hybrid vehicle 1-1 of the present embodiment is constructed in plural-axis type in which the input shaft 2 and the rotary shaft 34 of the second rotating electrical machine MG2 are arranged on different axes.

As shown in FIG. 2, the vehicle 100 includes an HV ECU 50, an MG ECU 60 and an engine ECU 70. The respective ECUs 50, 60, 70 are electronic control units containing a computer. The HV ECU 50 has a function of performing integrated control on the entire vehicle 100. The MG ECU 60 and the engine ECU 70 are connected electrically to the HV ECU 50.

The MG ECU 60 can control the first rotating electrical machine MG1 and the second rotating electrical machine MG2. The MG ECU 60 can adjust a current value supplied to the first rotating electrical machine MG1 to control an output torque of the first rotating electrical machine MG1 and then can adjust the current value supplied to the second rotating electrical machine MG2 to control an output torque of the second rotating electrical machine MG2, for example.

The engine ECU 70 can control the engine 1. The engine ECU 70 can, for example, control opening of an electronic throttle valve of the engine 1, perform ignition control of the engine by outputting an ignition signal and perform fuel injection control to the engine 1 and the like. The engine ECU 70 can control the output torque of the engine 1 by electronic throttle valve opening control, injection control, ignition control and the like.

A vehicle speed sensor, an accelerator operation amount sensor, an MG1 speed sensor, an MG2 speed sensor, an output shaft speed sensor, a battery sensor and the like are connected to the HV ECU 50. Through these sensors, the HV ECU 50 can obtain vehicle speed, accelerator operation amount, rotation speed of the first rotating electrical machine MG1, rotation speed of the second rotating electrical machine MG2, rotation speed of the output shaft of the power transmission device, battery condition SOC and the like.

Based on obtained information, the HV ECU 50 can calculate a requested drive power, a requested power, a requested torque and like to the vehicle 100. Based on the calculated request values, the HV ECU 50 determine an output torque of the first rotating electrical machine MG1 (hereinafter also referred to as "MG1 torque"), an output torque of the second rotating electrical machine MG2 (hereinafter also referred to as "MG2 torque") and an output torque of the engine 1 (hereinafter also referred to as "engine torque"). The HV ECU 50 outputs an instruction value about the MG1 torque and an instruction value about the MG2 torque to the MG ECU 60. Further, the HV ECU 50 outputs an instruction value about engine torque to the engine ECU 70.

The HV ECU 50 controls the clutch CL1 and the brake BK1 based on a traveling mode described below or the like. The HV ECU 50 outputs an instruction value (PbCL1) about supplied hydraulic pressure to the clutch CL1 and an instruction value (PbBK1) about supplied hydraulic pressure to the brake BK1. A hydraulic pressure control device (not shown) controls supplied hydraulic pressures to the clutch CU and the brake BK1 corresponding to the respective instruction values PbCL1, PbBK1.

FIG. 3 is a diagram showing an operating engagement table of the driving device for the hybrid vehicle 1-1 according to the present embodiment. The vehicle 100 can execute hybrid (HV) traveling or EV traveling selectively. The HV traveling refers to a traveling mode for driving the vehicle 100 with the engine 1 used as a power source. In the HV traveling, the second rotating electrical machine MG2 may be further used as a power source as well as the engine 1.

The EV traveling refers to a traveling mode for traveling with at least any one of the first rotating electrical machine MG1 and the second rotating electrical machine MG2 used as a power source. In the EV traveling, the vehicle can travel with the engine 1 stopped. As for the EV traveling mode, the driving device for the hybrid vehicle 1-1 according to the present embodiment has single-motor EV mode for driving the vehicle 100 with the second rotating electrical machine MG2 as a power source and both-motor EV mode for driving the vehicle 100 with both the first rotating electrical machine MG1 and the second rotating electrical machine MG2 as power sources.

Figure 4:
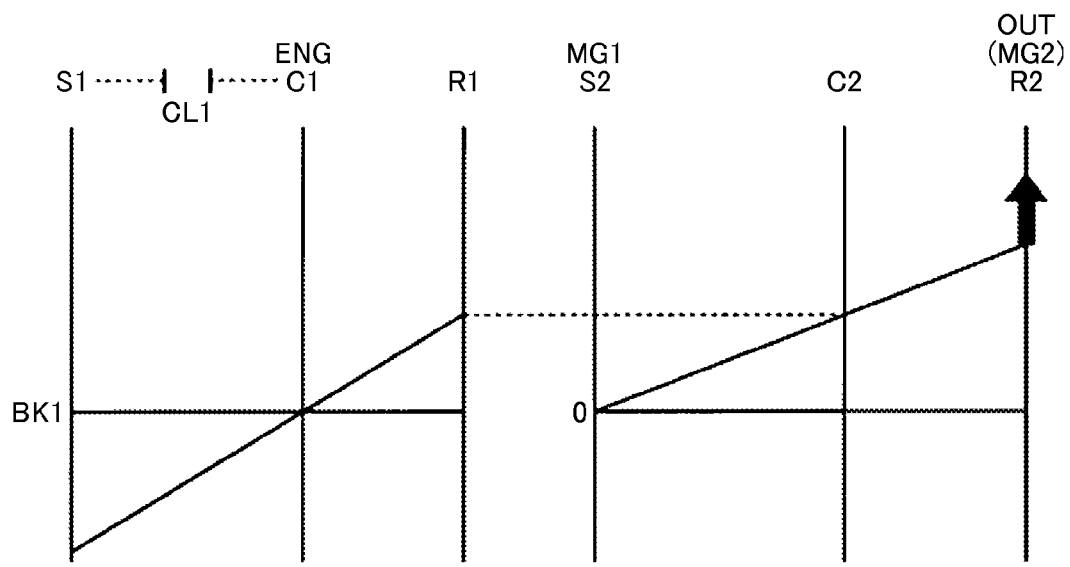
FIG. 4 is a nomographic chart about single-motor EV mode.

In the engagement table of FIG. 3, a circle in the columns of the clutch CL1 and the brake BK1 indicates engagement while a blank indicates release. Further, a triangle indicates that any one of engagement and release is possible. The single-motor EV mode is executed, for example, with both the clutch CL1 and the brake BK1 released. FIG. 4 is a nomographic chart about single-motor EV mode. In the nomographic chart, symbols S1, C1, R1 denote the first sun gear 11, the first carrier 14 and the first ring gear respectively. Symbols S2, C2, R2 denote the second sun gear 21, the second carrier 24, and the second ring gear 23 respectively.

When the single-motor EV mode is selected, the clutch CL1 and the brake BK1 are released. When the brake BK1 is released, the sun gear 11 is allowed to rotate and when the clutch CL1 is released, the first planetary gear mechanism 10 can perform differential motion. The HV ECU 50 makes the second rotating electrical machine MG2 output a positive torque via the MG ECU 60 to make the vehicle 100 generate a drive power in the forward direction. The second ring gear 23 rotates in the positive direction interlocked with a rotation of the driving wheels 32. The rotation in the positive direction mentioned here is assumed to be a rotation direction of the second ring gear 23 when the vehicle 100 travels forward. The HV ECU 50 causes the first rotating electrical machine MG1 to operate as a generator to reduce drag resistance loss. More specifically, the HV ECU 50 causes the first rotating electrical machine MG1 to generate electric power with a slight torque applied and turns the rotation speed of the first rotating electrical machine MG1 to zero rotation. As a result, the drag resistance loss of the first rotating electrical machine MG1 can be reduced.

The first ring gear 13 rotates in the normal direction in company with the second carrier 24. Because in the first planetary gear mechanism 10, the clutch CL1 and the brake BK1 are released so that they are in a neutral condition, the engine is not dragged, so that the first carrier 14 stops its rotation. Thus, a large regeneration amount can be obtained. The sun gear 11 idles and then rotates in the reverse direction. In the meantime, the neutral (neutral) condition of the first planetary gear mechanism 10 refers to a condition in which no power is transmitted between the first ring gear 13 and the first carrier 14, that is, a condition in which the engine 1 is separated from the second planetary gear mechanism 20 so that transmission of power is interrupted. If at least any one of the transmission gear unit clutch CL1 and the transmission gear unit brake BK1 is engaged, the first planetary gear mechanism 10 turns into a connecting condition which connects the engine 1 to the second planetary gear mechanism 20.

Upon traveling at single-motor EV mode, there may occur a case where the charging condition of the battery becomes full so that no regenerative energy can be obtained. In this case, it can be considered to use engine brake at the same time. By engaging the clutch CL1 or the brake BK1 to connect the engine 1 to the driving wheels 32. the engine brake can be applied to the driving wheels 32. If as indicated with a triangle symbol in FIG. 3, the clutch CL1 or the brake BK1 is engaged at single-motor EV mode, the engine 1 is dragged in company and by raising the engine speed by the first rotating electrical machine MG1, the engine braking condition can be obtained.

Figure 5:
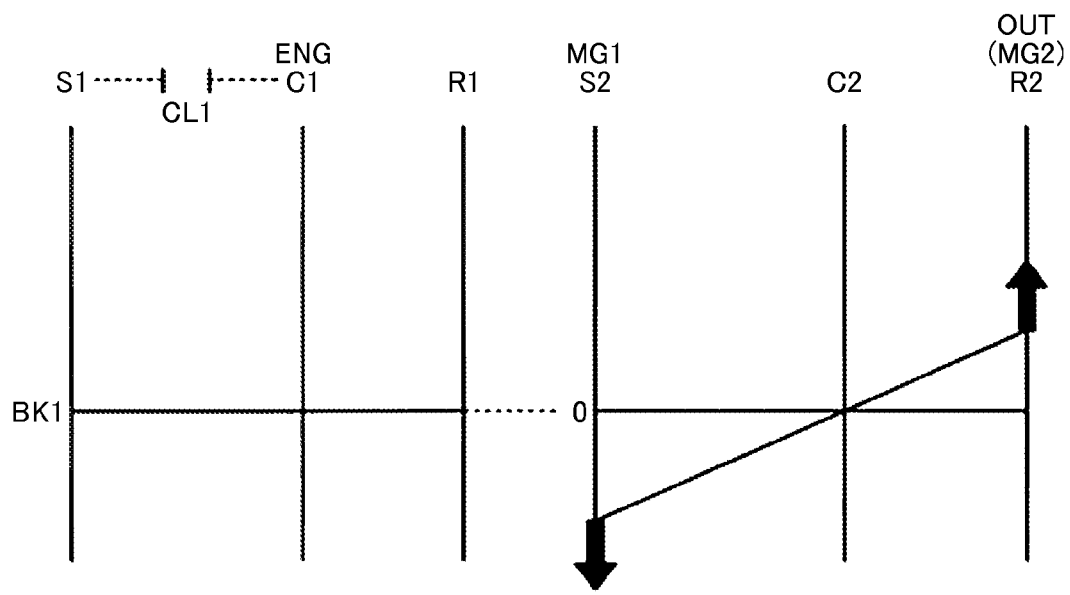
FIG. 5 is a nomographic chart about the both-motor EV mode.

When the both-motor EV mode is selected, the HV ECU 50 engages the clutch CL1 and the brake BK1. FIG. 5 is a nomographic chart about the both-motor EV mode. When the clutch CL1 is engaged, the differential motion of the first planetary gear mechanism 10 is limited and when the brake BK1 is engaged, the rotation of the first sun gear 11 is limited. Thus, rotations of all the rotating elements of the first planetary gear mechanism 10 stop. When the rotation of the first ring gear 13 which is an output element is limited, the second carrier 24 connected thereto is locked to zero rotation.

The HV ECU 50 causes the first rotating electrical machine MG1 and the second rotating electrical machine MG2 to output a driving torque for traveling. Because the rotation of the second carrier 24 is limited, it can obtain a reaction force against the torque of the first rotating electrical machine MG1 and output the torque of the first rotating electrical machine MG1 from the second ring gear 23. By outputting a negative torque at the time of traveling forward to attain negative rotation, the first rotating electrical machine MG1 can output a positive torque from the second ring gear 23. On the other hand, by outputting a positive torque at the time of traveling backward to attain positive rotation, the first rotating electrical machine MG1 can output a negative torque from the second ring gear 23.

Figure 6:
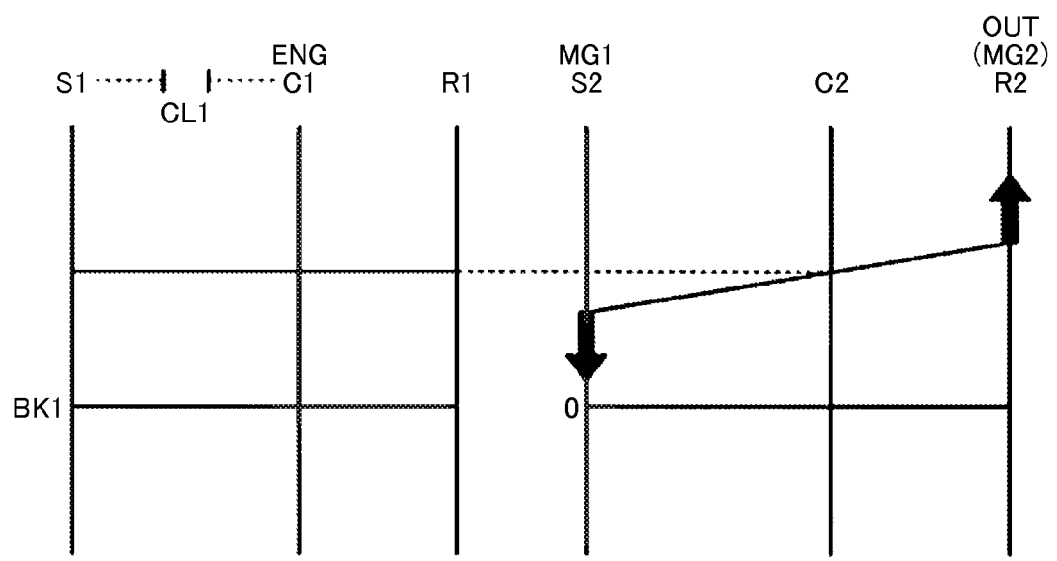
FIG. 6 is a nomographic chart about HV traveling mode in low condition
Figure 7:
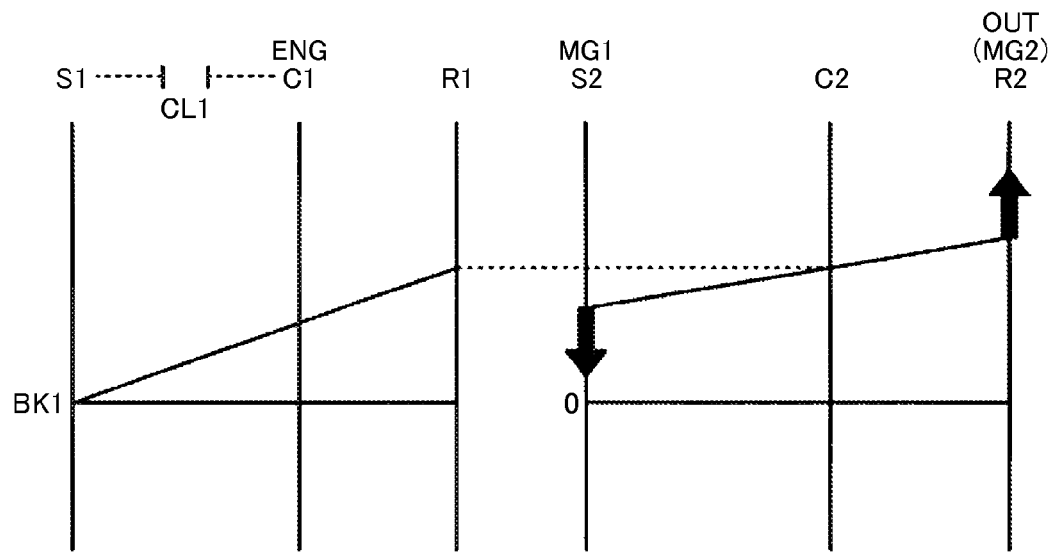
FIG. 7 is a nomographic chart concerning HV traveling mode in high condition.

Upon HV traveling, the second planetary gear mechanism 20 which serves as a differential unit is basically placed in an operating condition and the first planetary gear mechanism 10 which serves as a transmission gear unit is changed to low/high. FIG. 6 is a nomographic chart concerning HV traveling mode (hereinafter also described as "HV low mode") in low condition, and FIG. 7 is a nomographic chart concerning HV traveling mode (hereinafter also described as "HV high mode") in high condition.

When HV low mode is selected, the HV ECU 50 engages the clutch CL1 and releases the brake BK1. If the clutch CL1 is engaged, the differential motion of the first planetary gear mechanism 10 is limited so that the rotary elements 11, 13, 14 rotate integrally. Thus, the rotation of the engine 1 is transmitted from the first ring gear 13 to the second carrier 24 at an equivalent speed without being accelerated or decelerated.

On the other hand, when HV high mode is selected, the HV ECU 50 releases the clutch CL1 and engages the brake BK1. If the brake BK1 is engaged, the rotation of the first sun gear 11 is limited. Thus, in the first planetary gear mechanism 10, the rotation of the engine 1 input to the first carrier 14 is accelerated, thereby causing overdrive (OD) condition in which it is output through the first ring gear 13. In this way, the first planetary gear mechanism 10 can accelerate and output the rotation of the engine 1. The transmission gear ratio of the first planetary gear mechanism 10 at the time of overdrive can be set to, for example, 0.7.

In this way, the switching device, which is constituted of the clutch CL1 and the brake BK1, performs speed change of the first planetary gear mechanism 10 by switching between a state of limiting the differential motion of the first planetary gear mechanism 10 and a state of permitting the differential motion of the first planetary gear mechanism 10.

Figure 8:
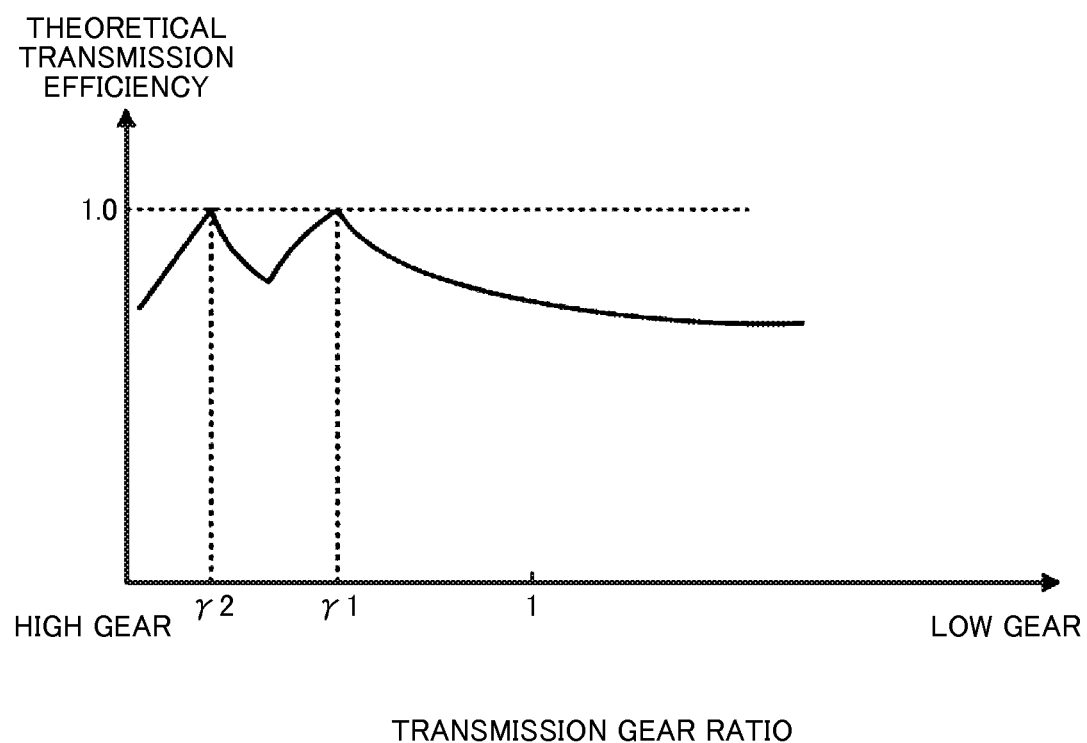
FIG. 8 is a diagram showing theoretical transmission efficiency line according to the embodiment.

The HV ECU 50 selects HV high mode under a high vehicle speed, for example, and under a medium/low vehicle speed, selects HV low mode. According to the present embodiment, the rotation of the engine 1 is output through speed change which is performed by switching between the HV high mode and the HV low mode, and consequently, two mechanical points described below can be produced, thereby improving fuel efficiency. FIG. 8 is a diagram showing theoretical transmission efficiency line according to the present embodiment.

In FIG. 8, the abscissa axis indicates transmission gear ratio and the ordinate axis indicates theoretical transmission efficiency. Here, the transmission gear ratio means a ratio (reduction gear ratio) of the input side rotation speed to the output side rotation speed of the planetary gear mechanisms 10, 20, and for example, indicates a ratio of the rotation speed of the first carrier 14 to the rotation speed of the second ring gear 23. On the abscissa axis, its left side indicates high gear side having a low transmission gear ratio and the right side indicates low gear side having a high transmission gear ratio. When all power input to the planetary gear mechanisms 10, 20 is transmitted to the counter drive gear 25 through mechanical transmission not through electric path, the theoretical transmission efficiency turns to maximum efficiency of 1.0.

The curve line shown in FIG. 8 is a theoretical transmission efficiency line under HV traveling mode when the HV high mode and the HV low mode are switched appropriately. For example, a higher efficiency mode of the HV high mode and the HV low mode is selected under an equivalent transmission gear ratio. Relatively speaking, the right side indicates theoretical transmission efficiency line under the HV low mode and the left side indicates theoretical transmission efficiency line under the HV high mode. The transmission efficiency under the HV low mode becomes maximum efficiency at a transmission gear ratio of $\gamma 1$. At the transmission gear ratio of $\gamma 1$, the rotation speed of the first rotating electrical machine MG1 (second sun gear 21) turns to zero. Thus, at the transmission gear ratio $\gamma 1$, electrical path originating by the first rotating electrical machine MG1's receiving a reaction force is zero and power can be transmitted from the engine 1 to the counter drive gear 25 only by mechanical transmission of power. This transmission gear ratio $\gamma 1$ is a transmission gear ratio on the overdrive side, that is, a transmission gear ratio smaller than 1. In the present specification, this transmission gear ratio $\gamma 1$ is also described as "first mechanical transmission gear ratio $\gamma 1$".

The theoretical transmission efficiency at HV high mode reaches maximum efficiency at the transmission gear ratio $\gamma 2$. At HV high mode, the rotation speed of the first rotating electrical machine MG1 (second sun gear 21) becomes zero at transmission gear ratio of $\gamma 2$, so that power can be transmitted from the engine 1 to the counter drive gear 25 by only transmission of mechanical power. This transmission gear ratio $\gamma 2$ is a transmission gear ratio on the high gear side with respect to the first mechanical transmission gear ratio $\gamma 1$. In the present specification, this transmission gear ratio $\gamma 2$ is also described as "second mechanical transmission gear ratio $\gamma 2$".

The theoretical transmission efficiency of the HV traveling mode decreases as the transmission gear ratio changes to values on the low gear side with respect to the first mechanical transmission gear ratio $\gamma 1$. Further, the theoretical transmission efficiency of the HV traveling mode decreases as the transmission gear ratio changes to values on the high gear side with respect to the second mechanical transmission gear ratio $\gamma 2$. The theoretical transmission efficiency of the HV traveling mode is curved to the lower efficiency side in a transmission gear ratio range between the first mechanical transmission gear ratio $\gamma 1$ and the second mechanical transmission gear ratio $\gamma 2$.

As described above, the driving device for the hybrid vehicle 1-1 according to the present embodiment has two mechanical points on the high gear side with respect to the transmission gear ratio 1. By provision of the transmission gear unit including the first planetary gear mechanism 10, the clutch CL1 and the brake BK1, the driving device for the hybrid vehicle 1-1 can generate a second mechanical point (second mechanical transmission gear ratio $\gamma 2$) on the high gear side with respect to the mechanical point (first mechanical transmission gear ratio $\gamma 1$) of a case when the engine 1 is connected directly to the second carrier 24. Thus, the transmission efficiency when the high gear is activated can be improved. That is, a hybrid system capable of improving fuel efficiency by improvement of the transmission efficiency at the time of high-speed traveling can be achieved.

When the HV ECU 50 switches between the HV high mode and the HV low mode, it executes cooperative speed change control of performing speed change in the first planetary gear mechanism 10 and the second planetary gear mechanism 20 at the same time. In the cooperative speed change control, the HV ECU 50 increases the transmission gear ratio of one of the first planetary gear mechanism 10 and the second planetary gear mechanism 20 while decreasing the transmission gear ratio of the other one.

When the HV ECU 50 switches from the HV high mode to the HV low mode, it changes the transmission gear ratio of the second planetary gear mechanism 20 to the high gear side synchronously with the mode switching. As a result, a discontinuous change in transmission gear ratio from the engine 1 to the driving wheels 32 of the entire vehicle 100 can be suppressed or reduced, thereby reducing the degree of the change in transmission gear ratio. Because the change in transmission gear ratio from the engine 1 to the driving wheels 32 is suppressed, the adjustment amount of the engine rotation speed accompanied by a speed change can be reduced or necessity of the adjustment of the engine rotation speed can be eliminated. For example, to allow the transmission gear ratio of the entire vehicle 100 to change continuously to the low side, the HV ECU 50 executes the speed change of the first planetary gear mechanism 10 and the second planetary gear mechanism 20 in cooperation with each other.

On the other hand, when the HV ECU 50 switches from the HV low mode to the HV high mode, it changes the transmission gear ratio of the second planetary gear mechanism 20 to the low gear side synchronously with the mode switching. As a result, a discontinuous change in transmission gear ratio of the entire vehicle 100 can be suppressed or reduced, thereby reducing the degree of the change in transmission gear ratio. For example, to allow the transmission gear ratio of the entire vehicle 100 to change continuously to the high side, the HV ECU 50 executes the speed change of the first planetary gear mechanism 10 and the second planetary gear mechanism 20 by cooperation with each other.

The adjustment of the transmission gear ratio of the second planetary gear mechanism 20 is performed by controlling the rotation speed of the first rotating electrical machine MG1, for example. The HV ECU 50 controls the first rotating electrical machine MG1 to change the transmission gear ratio between the input shaft 2 and the counter drive gear 25 steplessly, for example. As a result, the whole of the planetary gear mechanisms 10, 20, the first rotating electrical machine MG1, the clutch CL1 and the brake BK1, that is, the transmission device including the differential unit and the transmission gear unit operates as an electrical stepless transmission.

(Engine Startup Control)

Figure 9:
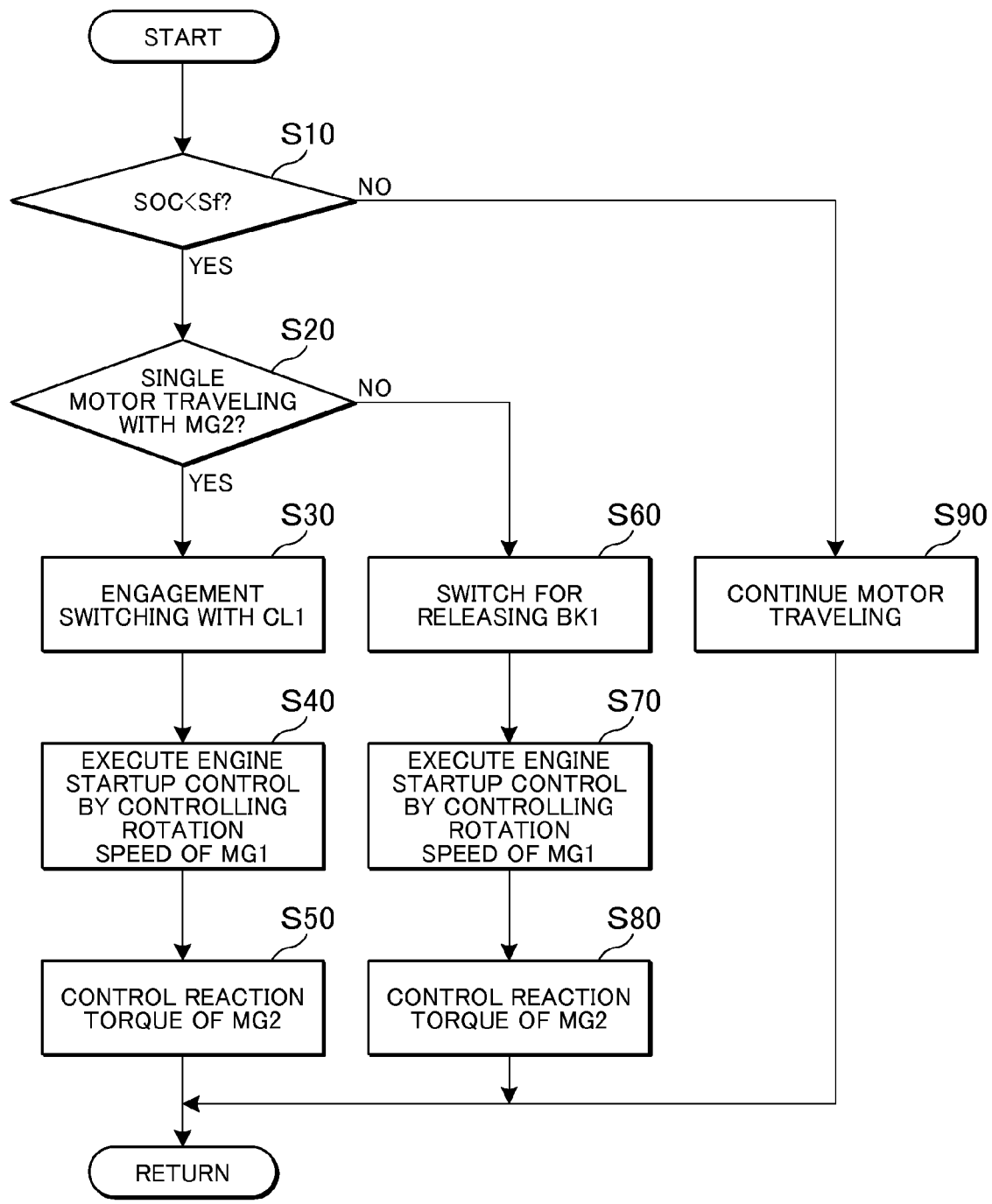
FIG. 9 is a flow chart concerning engine startup control of the embodiment.
Figure 10:
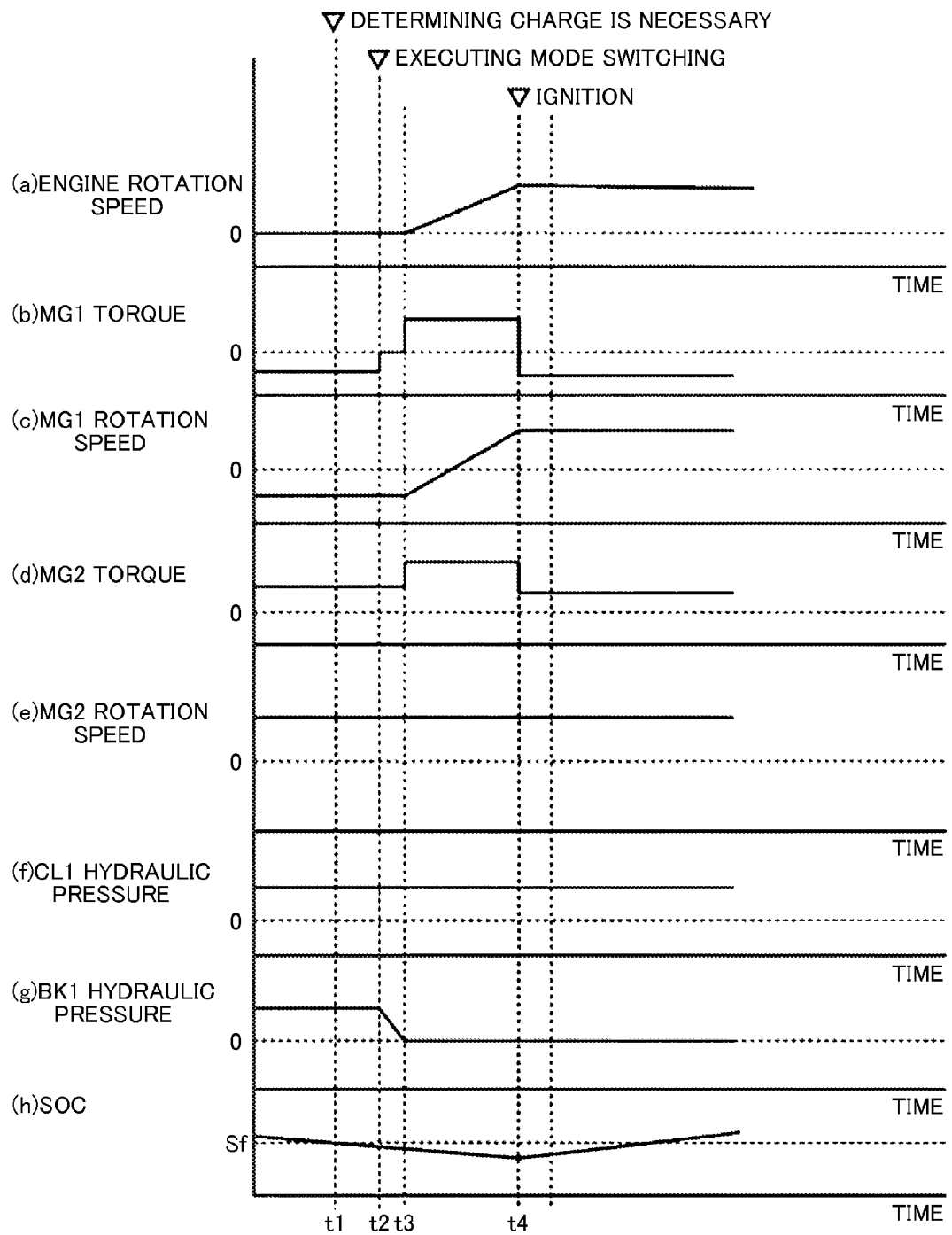
FIG. 10 is a time chart concerning engine startup control of the embodiment.

Next, the engine startup control of the driving device for the hybrid vehicle 1-1 according to the present embodiment will be described. When the HV ECU 50 is changed, for example, from the EV traveling mode to the HV traveling mode, the engine 1 which has been stopped is started. The HV ECU 50 starts the engine 1, for example, by rotating the engine 1 by means of the first rotating electrical machine MG1. The engine startup control will be described with reference to FIG. 9. FIG. 9 is a flow chart concerning the engine startup control according to the present embodiment and FIG. 10 is a time chart concerning the engine startup control according to the present embodiment. In FIG. 10, (a) indicates engine rotation speed, (b) indicates MG1 torque, (c) indicates rotation speed of the first rotating electrical machine MG1, (d) indicates MG2 torque, (e) indicates rotation speed of the second rotating electrical machine MG2, (f) indicates hydraulic pressure of the clutch CL1, (g) indicates hydraulic pressure of the brake BL1, and (h) indicates charging condition SOC. A control flow shown in FIG. 9 is executed during traveling at the EV traveling mode, for example.

In step S10, whether the charging condition SOC is less than a threshold Sf is determined by the HV ECU 50. This threshold Sf is used for determining whether the battery needs to be charged by starting the engine 1, for example. If as a result of determination of step S10, it is determined that the charging condition SOC is less than the threshold Sf (Yes in step S10), the processing proceeds to step S20 and otherwise (No in step S10), the processing proceeds to step S90. In FIG. 10, the charging condition SOC becomes less than the threshold Sf at time t1 and affirmative determination is made in step S10.

In step S20, whether single-motor EV mode by the second rotating electrical machine MG2 has been selected is determined by the HV ECU 50. If a required drive power to the vehicle 100 is smaller than a predetermined value P1, the single-motor EV mode by the second rotating electrical machine MG2 is selected. On the other hand, if the required power is equal to or more than the predetermined value 1, the both-motor EV mode is selected. If as a result of determination in step S20, it is determined that the vehicle 100 is traveling at the single-motor EV mode (Yes in step S20), the processing proceeds to step S30 and otherwise (No in step S20), the processing proceeds to step S60.

In step S30, engagement switching of the clutch CL1 is performed by the HV ECU 50. The single-motor EV mode includes a case where the clutch CL1 and the brake BK1 are both released, a case where the clutch CL1 is engaged while the brake BK1 is released and a case where the clutch CL1 is released while the brake BK1 is engaged. The HV ECU 50 switches to a condition in which the clutch CL1 is engaged while the brake BK1 is released. If step S30 is executed, the processing proceeds to step S40.

In step S40, the HV ECU 50 executes engine startup control by controlling the rotation speed of the first rotating electrical machine MG1. When the clutch CL1 is engaged, the engine 1 is connected to the first rotating electrical machine MG1, the second rotating electrical machine MG2 and the driving wheels 32, the engine 1 is dragged in company therewith. The HV ECU 50 sets the rotation speed of the second carrier 24 to zero by the rotation speed control of the first rotating electrical machine MG1, for example, so as to engage the transmission gear unit clutch CL1. After the transmission gear unit clutch CL1 is engaged, the HV ECU 50 raises the engine rotation speed by the rotation speed control of the first rotating electrical machine MG1. When the engine rotation speed rises to a predetermined rotation speed, the HV ECU 50 supplies fuel to the engine 1 and starts the engine 1 by ignition control. After step S40 is executed, the processing proceeds to step S50.

In the meantime, when the clutch CL1 is engaged, the HV ECU 50 can increase supplied hydraulic pressure to the clutch CL1 gradually with the second carrier 24 rotating and engage the clutch CL1 smoothly. After the clutch CL1 is completely engaged or at the same time when the clutch torque capacity of the clutch CL1 is increased, the HV ECU 50 increases the engine rotation speed by the rotation speed control of the first rotating electrical machine MG1.

In step S50, reaction torque control of the second rotating electrical machine MG2 is performed by the HV ECU 50. When the engine rotation speed is increased by the rotation speed control of the first rotating electrical machine MG1, startup reaction torque is applied to the second ring gear 23 due to the MG1 torque. This startup reaction torque is a torque in the negative direction and reduces traveling power of the vehicle 100. The HV ECU 50 increases the torque of the second rotating electrical machine MG2 in the positive direction to block an escape of the drive power due to the startup reaction torque. That is, the reaction torque control is adapted to cause the second rotating electrical machine MG2 to output a cancel torque for cancelling the startup reaction torque. As a result, reduction in drivability due to fluctuation in torque at the time of engine startup is suppressed. When step S50 is executed, the present control flow ends.

In step S60, switching for releasing the brake BK1 is performed by the HV ECU 50. At the both-motor EV mode, each of the clutch CL1 and the brake BK1 is engaged. The HV ECU 50 switches to a condition in which the brake BK1 is released while the clutch CL1 is engaged. Referring to FIG. 10, the release of the brake BK1 is started at time t2. After step S60 is executed, the processing proceeds to step S70.

In step S70, the HV ECU 50 executes engine startup control by the rotation speed control of the first rotating electrical machine MG1. While the brake BK1 is released, the HV ECU 50 changes the MG1 torque from a negative torque up to then to zero. When release of the brake BK1 is completed at time t3, the HV ECU 50 changes the MG1 torque to a positive torque and causes the rotation of the first rotating electrical machine MG1 to change to a rotation in the normal direction. With a rise in rotation speed of the first rotating electrical machine MG1, the engine rotation speed rises. At this time, the MG1 torque may be a constant value or may change based on the rotation speed of the first rotating electrical machine MG1. When the engine rotation speed reaches a predetermined rotation speed at time t4, the HV ECU 50 supplies fuel to the engine 1 to ignite the engine. After self-sustaining operation of the engine 1 is started, the MG1 torque is switched to a negative torque so that the first rotating electrical machine MG1 receives a reaction torque of the engine 1. After step S70 is executed, the processing proceeds to step S80.

In step S80, reaction torque control of the second rotating electrical machine MG2 is performed by the HV ECU 50. The reaction torque control of step S80 may be the same as the reaction torque control of step S50. In FIG. 10, the MG2 torque is increased by the reaction torque control at time t3. At time 4 when ignition to the engine 1 is started and engine torque begins to be output, the reaction torque control ends and the MG2 torque is reduced. When step S80 is executed, the present control flow ends.

In step S90, motor traveling is continued by the HV ECU 50. Because no engine startup is necessary, the HV ECU 50 continues traveling at EV traveling mode. When step S90 is executed, the present control flow ends.

As described above, the driving device for the hybrid vehicle 1-1 according to the present embodiment is capable of switching between the HV high mode and the HV low mode by means of the transmission gear unit which includes the first planetary gear mechanism 10, the clutch CL1 and the brake BK1 to improve the transmission efficiency of the vehicle 100. Further, the second planetary gear mechanism 20 which serves as a differential unit is connected in series to a rear part of the transmission gear unit. Because the first planetary gear mechanism 10 is in overdrive condition, there is an advantage that the first rotating electrical machine MG1 does not have to be brought to a high torque considerably.

Further, by engaging the clutch CL1 and the brake BK1 of the transmission gear unit, rotation of the input element of the second planetary gear mechanism 20 can be limited, so that traveling on the both-motor EV mode can be performed. Thus, it is not necessary to provide any special clutch or the like to achieve the both-motor EV mode, thereby simplifying the structure. The layout of the present embodiment enables the reduction gear ratio of the second rotating electrical device MG2 to be increased. In addition, the FF or RR layout can achieve a compact arrangement.

Further, during traveling on the single-motor EV mode, the engine rotation speed is maintained at substantially zero by releasing the clutch CL1 and the brake BK1 of the transmission gear unit into a neutral state. Thus, no special clutch for engine separation is necessary.

Further, a fixing means for fixing the engine rotation speed to zero by engaging the rotating elements of the transmission gear unit with each other is constituted of a plurality of engagement devices. More specifically, the fixing means of the present embodiment includes two engagement devices, i.e., the clutch CL1 and the brake BK1. When the engine 1 is started from the both-motor EV mode, one of the engagement units is kept engaged while the other engagement unit is released to switch to the power transmission state. Because only one engagement unit is released, the control of increasing the engine rotation speed by means of the first rotating electrical machine MG1 can be performed easily when the engine is started.

Further, during traveling of the HV, the HV high mode and the HV low mode can be switched by performing the speed change of the transmission gear unit. Because two mechanical points can be obtained by this speed change, generation of power recirculation can be suppressed by selecting an appropriate transmission gear ratio at the time of high-speed traveling. Further, by performing speed change of the second planetary gear mechanism 20 at the time of the speed change of the transmission gear unit at the same time, a sudden change in transmission gear ratio can be suppressed.

Although in the present embodiment, at the time of engine startup from the single-motor EV mode, it is assumed that the clutch CL1 is engaged while the brake BK1 is released, instead, the engine startup may be performed in a condition in which the brake BK1 is engaged while the clutch CL1 is released.

Although the clutch CL1 of the present embodiment is so constructed to connect the first sun gear 11 to the first carrier 14, the present invention is not restricted to this example. Any clutch CL1 may be used as long as it can limit the differential motion of the first planetary gear mechanism 10 by connecting the respective rotary elements 11, 13, 14 of the first planetary gear mechanism 10. Further, the brake BK1 is not restricted to a brake which limits the rotation of the first sun gear 11. The brake BK1 may be a brake which limits the rotation of other rotating element of the first planetary gear mechanism 10.

Any switching device may be used as long as it can switch between a state of limiting a rotation of the output element of the first planetary gear mechanism 10 and a state of permitting a rotation of the output element, and thus, the present invention is not restricted to an exemplified combination of the clutch CL1 and the brake BK1.

Although in the present embodiment, the power transmission mechanism and the differential mechanism (output side differential mechanism) are the planetary gear mechanisms 10, 20 respectively, the present invention is not restricted to this example. The power transmission mechanism may be other known differential mechanism or any gear mechanism capable of switching to multiple gear ratios. Further, as the output side differential mechanism, other known differential mechanism may be used.

The power transmission mechanism may be, for example, of twin-clutch type. For example, the power transmission mechanism may include a first transmission unit that transmits a rotation of the engine 1 to the second planetary gear mechanism 20 at a first transmission gear ratio via a first clutch and a second transmission unit that transmits the rotation of the engine 1 to the second planetary gear mechanism 20 at a second transmission gear ratio via a second clutch. The first transmission gear ratio and the second transmission gear ratio are different from each other. This power transmission mechanism turns into a connecting state capable of transmitting a power from the engine 1 to the second planetary gear mechanism 20 by engaging any one of the first clutch and the second clutch. Further, in the power transmission mechanism, the rotation of the output element is limited by engaging the first clutch and the second clutch together. Further, the power transmission mechanism turns into a neutral state incapable of transmitting the power between the engine 1 and the second planetary gear mechanism 20 by releasing the first clutch and the second clutch together.

As such a structure, there is a structure which includes an input gear which is connected to the input element of the second planetary gear mechanism 20 and a first gear and a second gear which engage with this input gear respectively, for example. The first gear is connected to the engine 1 via the first clutch and the second gear is connected to the engine 1 via the second clutch. Further, the numbers of teeth of the first gear and the second gear are different from each other. The first transmission unit includes the first gear, the first clutch and the input gear. The second transmission unit includes the second gear, the second clutch and the input gear. When the first clutch is engaged, the rotation of the engine 1 is transmitted to the second planetary gear mechanism 20 at a transmission gear ratio corresponding to a gear ratio between the first gear and the input gear by the first transmission unit. When the second clutch is engaged, the rotation of the engine 1 is transmitted to the second planetary gear mechanism 20 at a transmission gear ratio corresponding to a gear ratio between the second gear and the input gear by the second transmission unit. Further, if the first clutch and the second clutch are engaged together, the rotation of the input gear is limited due to a difference in gear ratio between the first transmission unit and the second transmission unit. In the meantime, the first transmission unit and the second transmission unit may further include a gear transmission mechanism.

Although in the present embodiment, the engine to be connected to the first planetary gear mechanism 10 is the engine 1, instead, other known engine may be connected to the first planetary gear mechanism 10.

[First Modification of the Embodiment]

Figure 11:
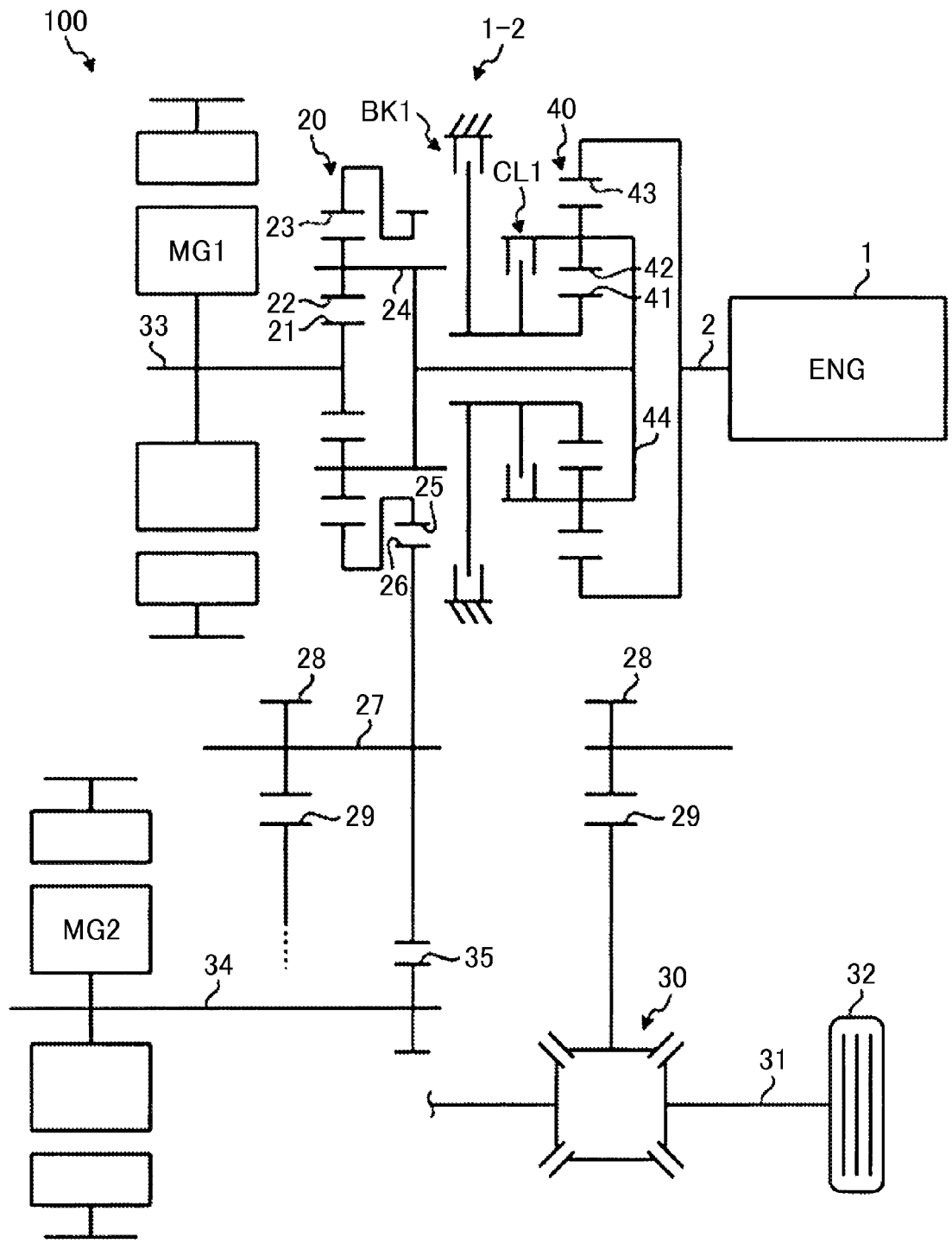
FIG. 11 is a skeleton diagram of a vehicle according to a first modification of the embodiment.

The first modification of the embodiment will be described. FIG. 11 is a skeleton diagram of the vehicle 100 according to the first modification. Points of the driving device for the hybrid vehicle 1-2 of the present modification different from the driving device for the hybrid vehicle 1-1 of the above-described embodiment are that a first planetary gear mechanism 40 is based on under-drive speed change and about an arrangement of the clutch CL1 and the brake BK1.

The structure of the first planetary gear mechanism 40 may adopt the same structure as the first planetary gear mechanism 10 of the above-described embodiment. The first planetary gear mechanism 40 includes a first sun gear 41, a first pinion gear 42, a first ring gear 43 and a first carrier 44. As shown in FIG. 11, an input shaft 2 is connected to a first ring gear 43 of the first planetary gear mechanism 40. Further, a first carrier 44 of the first planetary gear mechanism 40 is connected to a second carrier 24. That is, in the present modification, the input element of the first planetary gear mechanism 40 is the first ring gear 43 and the output element thereof is the first carrier 44.

The clutch CL1 can connect the first sun gear 41 to the first carrier 44 like the above-described embodiment. Further, the brake BK1 can limit a rotation of the first sun gear 41 like the above-described embodiment. In the present modification, the clutch CL1 and the brake BK1 are arranged between the first planetary gear mechanism 40 and the second planetary gear mechanism 20. According to the present modification, coaxially with the engine 1, the first planetary gear mechanism 40, the clutch CL1, the brake BK1, a counter drive gear 25, a second planetary gear mechanism 20 and a first rotating electrical machine MG1 are arranged in order from the engine 1 side.

The first planetary gear mechanism 40 can reduce the rotation of the engine 1 and output from the first carrier 44. If the brake BK1 is engaged and the clutch CL1 is released, under-drive state in which the rotation speed of the first carrier 44 as the output element is lower than the rotation speed of the first ring gear 43 as the input element is produced. The transmission gear ratio of the first planetary gear mechanism 40 at this time may be for example, 1.4. On the other hand, if the clutch CL1 is engaged while the brake BK1 is released, the rotation speed of the first ring gear 43 becomes equal to the rotation speed of the first carrier 44.

Thus, in the driving device for the hybrid vehicle 1-2 of the present modification, when the HV low mode is selected, the brake BK1 is engaged and the clutch CL1 is released. When the HV high mode is selected, the clutch CL1 is engaged and the brake BK1 is released.

In the driving device for the hybrid vehicle 1-2 of the present modification, opposite to the above-described embodiment, a second mechanical transmission gear ratio $\gamma 2$ turns to a transmission gear ratio on the low gear side with respect to a first mechanical transmission gear ratio $\gamma 1$. In the meantime, both the first mechanical transmission gear ratio $\gamma 1$ and the second mechanical transmission gear ratio $\gamma 2$ are transmission gear ratios on the high gear side with respect to transmission gear ratio 1 which is common to the above-described embodiment.

[Second Modification of the Embodiment]

The second modification of the embodiment will be described. Although the driving devices for the hybrid vehicle 1-1, 1-2 of the above-described embodiment and the first modification are of multiple-axis type, instead, they may be of single-axis type. FIG. 12 is a skeleton diagram of the vehicle 100 according to the present modification.

As shown in FIG. 12, the driving device for the hybrid vehicle 1-3 of the present modification is of single-axis type in which the engine 1, the first planetary gear mechanism 10, the first rotating electrical machine MG1, a second planetary gear mechanism 80, and the second rotating electrical machine MG2 are arranged coaxially. The brake BK1, the clutch CL1, the first planetary gear mechanism 10, the first rotating electrical machine MG1, the second planetary gear mechanism 80, and the second rotating electrical machine MG2 are arranged in order from the engine 1 side.

The structure of the transmission gear unit may be constructed in the same structure as the transmission gear unit of the driving device for the hybrid vehicle 1-1 of the above-described embodiment. A rotary shaft 33 of the first rotating electrical machine MG1 is hollow and a connecting shaft 85 is inserted therein. The connecting shaft 85 connects the first ring gear 13 to the second carrier 84. The second planetary gear mechanism 80 includes a second sun gear 81, a second pinion gear 82, a second ring gear 83 and a second carrier 84, and may be constructed in the same structure as the second planetary gear mechanism 20 of the above-described embodiment.

The second ring gear 83 is connected to the rotary shaft 34 of the second rotating electrical machine MG2. The rotary shaft 34 is a propeller shaft. An opposite side to the second ring gear 83 side of the rotary shaft 34 is connected to driving wheels via a differential device and a drive shaft (not shown). The driving device for the hybrid vehicle 1-3 of the present modification may be applied to an FR (front engine rear wheel drive), for example.

[Third Modification of the Embodiment]

Figure 13:
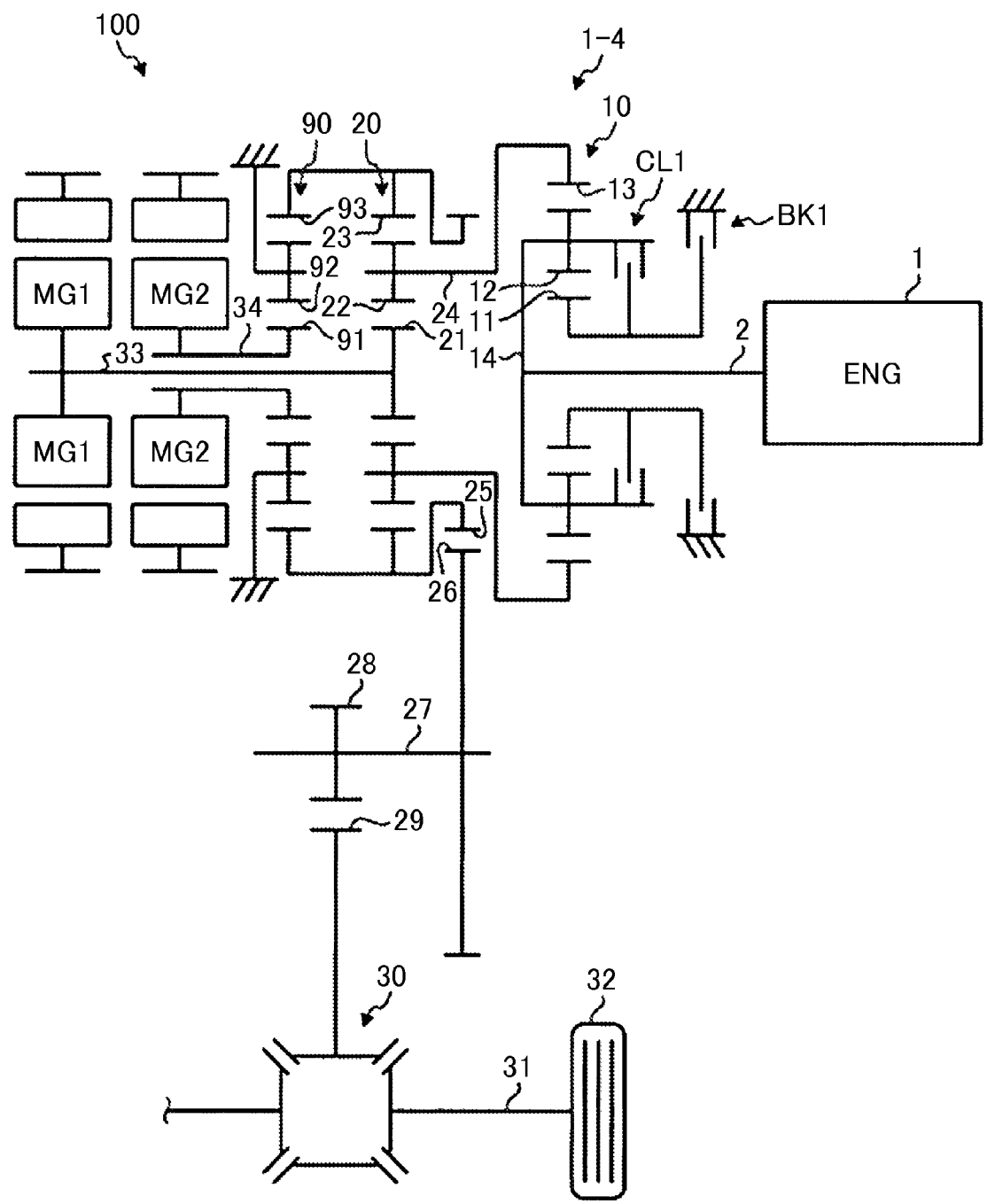
FIG. 13 is a skeleton diagram of a vehicle according to a third modification of the embodiment.

The third modification of the embodiment will be described. The driving device for the hybrid vehicle 1-4 of the present modification is of single-axis type which may be applied to an FF vehicle and RR vehicle. FIG. 13 is a skeleton diagram of the vehicle 100 according to the present modification.

As shown in FIG. 13, the driving device for the hybrid vehicle 1-4 of the present modification is of single-axis type in which the engine 1, the first planetary gear mechanism 10, the second planetary gear mechanism 20, a third planetary gear mechanism 90, the first rotating electrical machine MG1 and the second rotating electrical machine MG2 are arranged coaxially. The brake BK1, the clutch CL1, the first planetary gear mechanism 10, the counter drive gear 25, the second planetary gear mechanism 20, the third planetary gear mechanism 90, the second rotating electrical machine MG2, and the first rotating electrical machine MG1 are arranged in order from the engine 1 side.

The structure of the transmission gear unit may be constructed in the same structure as the transmission gear unit of the driving device for the hybrid vehicle 1-1 of the above-described embodiment. The third planetary gear mechanism 90 is of single-pinion type, which includes a third sun gear 91, a third pinion gear 92, and a third ring gear 93. A carrier that supports the third pinion gear 92 is fixed not to be rotatable. The third ring gear 93 is connected to the second ring gear 23 and the counter drive gear 25. The third sun gear 91 is connected to rotary shaft 34 of the second rotating electrical machine MG2. The third planetary gear mechanism 90 can decelerate the rotation of the second rotating electrical machine MG2 and output from the third ring gear 93.

[Fourth Modification of the Embodiment]

Although in the above-described embodiment and respective modifications, the first planetary gear mechanisms 10, 40 and the second planetary gear mechanisms 20, 80 are of single-pinion type, the present invention is not restricted to this example. For example, at least any one of the first planetary gear mechanisms 10, 40 and the second planetary gear mechanisms 20, 80 may be of double-pinion type. For example, the first planetary gear mechanisms 10, 40 may be constructed in a double-pinion type planetary gear mechanism. In this case, in the respective nomographic charts, the position of the first ring gear 13, 43 is exchanged with the position of the first carrier 14, 44. For the single-pinion type and the double-pinion type, the over-drive and the under-drive of the transmission gear unit are reversed.

According to the above-described embodiment and the respective modifications, there is disclosed a driving device which includes an engine, a transmission gear unit, and a differential unit, wherein an output shaft of the engine is connected to an input shaft of the transmission gear unit, the first element of the differential unit is connected to the output shaft of the transmission gear unit, the first rotating machine (electrical machine) is connected to the second element, the second rotating machine (electrical machine) is connected to the third element, and the engine rotation speed can be fixed to zero by engaging the elements of the transmission gear unit.

The content disclosed in the above-described embodiment and the respective modifications may be combined appropriately for execution.

Description of Reference Numerals

1-1, 1-2, 1-3/DRIVING DEVICE FOR THE HYBRID VEHICLE
1/ENGINE
10, 40/FIRST PLANETARY GEAR MECHANISM
13, 43/FIRST RING GEAR
14, 44/FIRST CARRIER
20, 80/SECOND PLANETARY GEAR MECHANISM
21, 81/SECOND SUN GEAR
23, 83/SECOND RING GEAR
24, 84/SECOND CARRIER
32/DRIVE WHEEL
50/HV ECU
60/MG ECU
70/ENGINE ECU
100/VEHICLE
BK1/BRAKE
CL1/CLUTCH
MG1/FIRST ROTATING ELECTRICAL MACHINE

The invention claimed is:

1. A driving device for a hybrid vehicle, the driving device comprising:
a power transmission mechanism connected to an engine, the power transmission mechanism is a single planetary gear mechanism configured to transmit a rotation of the engine;
a differential mechanism that connects the power transmission mechanism to driving wheels; and
a switching device configured to perform speed change of the power transmission mechanism,
wherein the differential mechanism includes a first rotary element that is connected to an output element of the power transmission mechanism, a second rotary element that is connected to a first rotating electrical machine and a third rotary element that is connected to a second rotating electrical machine and the driving wheels,
wherein the switching device includes a single clutch configured to connect rotary elements of the power transmission mechanism and a single brake configured to limit the rotation of the rotary element of the power transmission mechanism;
the rotation of the output element of the power transmission mechanism is limited by the switching device, and
the driving device has a mode in which the rotation of the output element of the power transmission mechanism is limited by the switching device and the first rotating electrical machine and the second rotating electrical machine are used as power sources.

2. The driving device for the hybrid vehicle according to claim 1, wherein
the power transmission mechanism is configured to accelerate and output the rotation of the engine.

3. The driving device for the hybrid vehicle according to claim 1, wherein
the power transmission mechanism is configured to decelerate and output the rotation of the engine.

4. The driving device for the hybrid vehicle according to claim 1, wherein
the power transmission mechanism is a differential mechanism, and
the switching device performs speed change of the power transmission mechanism by switching between a state of limiting a differential motion of the power transmission mechanism and a state of permitting the differential motion of the power transmission mechanism.

5. The driving device for the hybrid vehicle according to claim 1, wherein the speed change in the power transmission mechanism and the speed change in the differential mechanism are performed at the same time.

6. The driving device for the hybrid vehicle according to claim 5, wherein
when the speed change in the power transmission mechanism and the speed change in the differential mechanism are performed at the same time, a transmission gear ratio of one of the power transmission mechanism and the differential mechanism is increased while the transmission gear ratio of the other one is decreased.

7. The driving device for the hybrid vehicle according to claim 1, wherein
the power transmission mechanism is a differential mechanism.

* * * * *